Sept. 27, 1932.  S. MISKELLY  1,880,037
RAILWAY TRAFFIC CONTROLLING APPARATUS
Filed Feb. 13, 1932
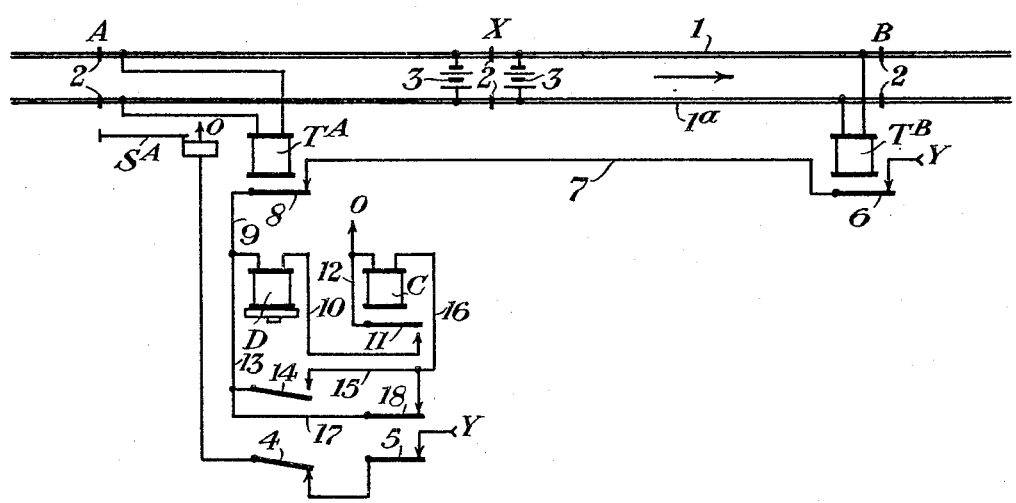
INVENTOR.
Samuel Miskelly.
By
HIS ATTORNEY.

Patented Sept. 27, 1932

1,880,037

UNITED STATES PATENT OFFICE

SAMUEL MISKELLY, OF DOWNERS GROVE, ILLINOIS, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Application filed February 13, 1932. Serial No. 592,747.

My invention relates to railway traffic controlling apparatus, and particularly to apparatus involving traffic controlling devices, such as signals, controlled by track circuits.

One feature of my invention is the provision of novel and improved means for preventing an undesirable operation of a signal in the event of a momentary loss of shunt of a track circuit, or when a light engine or car passes from one track section to another if the track relay for the rear section closes before the track relay for the forward section opens.

I will describe one form of apparatus embodying my invention, and will then point out the novel features thereof in claims.

The accompanying drawing is a diagrammatic view illustrating one form of apparatus embodying my invention.

Referring to the drawing, the reference characters 1 and 1$^a$ designate the track rails of a stretch of railway track along which traffic normally moves in the direction indicated by the arrow. These track rails are divided, by means of insulated joints 2, to form a plurality of blocks of which only one block A—B is shown in the drawing. This block is further divided by means of insulated joints 2 to form two track sections A—X and X—B. Each of these sections is provided with a track circuit comprising a track battery 3 connected across the rails at one end of the section and a track relay T connected at the other end of the section.

Located adjacent the entrance end of the block A—B is a signal S$^A$ which may be of any suitable type, but which in the form here shown, is a quick-acting two-position semaphore signal capable of indicating "stop" or "proceed" according as the semaphore arm is in the horizontal or vertical position, in which latter position it is shown in the drawing.

The signal S$^A$ is controlled jointly by a quick-acting relay C and by a slow-acting relay D in such manner that the signal will be energized when and only when relay C is energized and relay D is deenergized. The circuit for signal S$^A$ passes from terminal Y of a suitable source of current not shown in the drawing, through front contact 5 of relay C, back contact 4 of relay D, and the operating mechanism of signal S$^A$ to the other terminal O of the source.

Relay D is provided with a circuit which is controlled by the track relays T$^A$ and T$^B$ and by relay C, and which passes from terminal Y through front contact 6 of track relay T$^B$, wire 7, front contact 8 of track relay T$^A$, wire 9, the winding of relay D, wire 10, back contact 11 of relay C, and wire 12 to the other terminal O of the source.

Relay C is provided with a pick-up circuit which is controlled by track relays T$^A$ and T$^B$ and by relay D, and which passes from terminal Y through front contact 6 of track relay T$^B$, wire 7, front contact 8 of track relay T$^A$, wires 9 and 13, front contact 14 of relay D, wires 15 and 16, and the winding of relay C to terminal O. Relay C is also provided with a stick circuit which passes from terminal Y through front contact 6 of track relay T$^B$, wire 7, front contact 8 of track relay T$^A$, wires 9, 13 and 17, front contact 18 of relay C, wire 16, and the winding of relay C to terminal O.

As shown in the drawing, track sections A—X and X—B are both unoccupied, so that track relays T$^A$ and T$^B$ are both energized. Relay D is deenergized, but relay C is energized over its stick circuit. The circuit for signal S$^A$ is therefore closed, and signal S$^A$ accordingly indicates proceed.

In explaining the operation of the apparatus as a whole, I will assume that with the parts in the conditions just described, a vehicle moving toward the right traverses the stretch of track shown in the drawing. When the vehicle enters section A—X, it shunts track relay T$^A$, thus causing this relay to open, and hence interrupting the stick circuit which was previously closed for relay C. Relay C therefore becomes deenergized and deenergizes signal S$^A$, so that signal S$^A$ now moves to its stop position. As the vehicle passes from section A—X to section X—B, track relay T$^B$ becomes de-energized and track relay T$^A$ becomes energized, but as long as the resultant opening of front contact 6 of track relay T$^B$ occurs before the resultant closing of front contact 8 of track relay T^A, as will normally be the case, no change in the remainder of the apparatus will take place, because, under these conditions, all of the circuits for the relays C and D will remain open at front contact 6 of track relay T^B. When the vehicle departs from section X—B, track relay T^B will pick up and will complete, at its front contact 6, the previously described circuit for relay D; and as soon as a time interval has expired which depends upon the proportioning of the parts of relay D, this latter relay will also pick up, thus opening its back contact 4 and closing its front contact 14. The opening of back contact 4 of relay D holds the circuit for signal S^A open, and insures that this signal will not become energized as long as relay D remains energized. The closing of front contact 14 of relay D completes the previously described pick-up circuit for relay C, which relay then likewise picks up. The picking up of relay C completes, at its front contact 18, its stick circuit, so that this relay will now remain energized even though front contact 14 of relay D subsequently becomes opened. The picking up of relay C also interrupts, at its back contact 11, the pick-up circuit which was previously closed for relay D. Relay D therefore now becomes deenergized, and after a time interval opens its front contact 14 and closes its back contact 4. The opening of front contact 14 of relay D interrupts the pick-up circuit for relay C, and the closing of back contact 4 completes the circuit for signal S^A. Signal S^A therefore now moves to its proceed position, and the parts are then restored to their normal positions, in which positions they are shown in the drawing.

I will now assume that while the vehicle is passing from section A—X to section X—B, front contact 8 of track relay T^A becomes closed for a brief interval of time before front contact 6 of track relay T^B opens. If signal S^A were controlled directly by the track relays T^A and T^B, or through the medium of another relay which was controlled directly by these relays, the closing of front contact 8 under these conditions might cause signal S^A to move toward its proceed position, which would tend to confuse the operator of a second vehicle which was about to enter the block A—B. With apparatus embodying my invention, however, this undesirable condition is prevented, because, before the circuit for signal S^A can become closed, it is first necessary for the relays D and C to go through the same sequence of operation which was described hereinbefore in describing the operation of the apparatus after relay T^B had picked up due to the departure of the vehicle from section X—B. That is to say, relay D must first pick up, then relay C must pick up, and finally relay D must again release. Due to the slow-acting characteristics of relay D, this sequence of operation requires an interval of time of considerable duration, and the parts are so proportioned that this time interval will be longer than the time which would ever elapse in practice between the closing of contact 8 of relay T and the subsequent opening of contact 6 of relay T^B. It follows, therefore, that with apparatus embodying my invention, under the conditions described above, the sequence of operation of the relays D and C necessary to cause signal S^A to move to its proceed position would never be completed, and the signal would therefore remain at stop.

It will be readily understood from the foregoing that apparatus embodying my invention will likewise prevent an undesirable operation of signal S^A due to a temporary loss of shunt of the track sections A—X or X—B by a vehicle while the vehicle is traversing these sections.

One advantage of apparatus embodying my invention is that, since relay D must both pick up and release before the signal circuit controlled by the relays D and C and become closed after this circuit has once been opened, the time interval which will elapse after the pick-up circuit for relay D becomes closed due to the energization of either of the track relays T, and before the signal circuit finally becomes closed, will remain substantially constant through a wide variation in ambient temperature or in voltage or both. For, if the ambient temperature increases, or the voltage decreases, the pick-up time of relay D will increase but the release time will decrease, and likewise, if the ambient temperature decreases or the voltage increases, the pick-up time of relay D will decrease but the release time will increase.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a pair of wires, means for at times connecting said pair of wires with a source of current, two relays, means including a back contact of one of said relays for connecting the other relay with said pair of wires, means including a front contact of said other relay for at times connecting said one relay with said pair of wires, means including a front contact of said one relay for at other times connecting said one relay with said pair of wires, and an electro-responsive device controlled by a front contact of said one relay and a back contact of said other relay.

2. In combination, a pair of wires, means for at times connecting said pair of wires with a source of current, two relays, means including a back contact of one of said relays for connecting the other relay with said pair of wires, means including a front contact of said other relay for at times connecting said one relay with said pair of wires, means including a front contact of said one relay for at other times connecting said one relay with said pair of wires, an electro-responsive device, and means for energizing said device when and only when said one relay is energized and said other relay is deenergized.

3. In combination, a pair of wires, means for at times connecting said pair of wires with a source of current, two relays, means including a back contact of one of said relays for connecting the other relay with said pair of wires, means including a front contact of said other relay for at times connecting said one relay with said pair of wires, means including a front contact of said one relay for at other times connecting said one relay with said pair of wires, an electro-responsive device, and a circuit for controlling said device including a front contact of said one relay and a back contact of said other relay.

4. In combination, a pair of wires, means for at times connecting said pair of wires with a source of current, a slow-acting relay and a quick-acting relay, means including a back contact of said quick-acting relay for connecting said slow-acting relay with said pair of wires, means including a front contact of said slow-acting relay for at times connecting said quick-acting relay with said pair of wires, means including a front contact of said quick-acting relay for at other times connecting said quick-acting relay with said pair of wires, an electrical device, and a circuit for said device controlled by a front contact of said quick-acting relay and a back contact of said slow-acting relay.

5. In combination, a source of current, a quick-acting relay and a slow-acting relay, means including a back contact of said quick-acting relay for at times connecting said slow-acting relay with said source, means including a front contact of said slow-acting relay for at other times connecting said quick-acting relay with said source, means including a front contact of said quick-acting relay for at still other times connecting said quick-acting relay with said source, and an electrical device controlled by a front contact of said quick-acting relay and a back contact of said slow-acting relay.

6. In combination, two successive sections of railway track, a track circuit including a track relay for each section, two auxiliary relays, a pick-up circuit for one of said auxiliary relays controlled by both of said track relays and including a back contact of the other auxiliary relay, a pick-up circuit for said other auxiliary relay controlled by both of said track relays and including a front contact of said one auxiliary relay, a stick circuit for said other auxiliary relay controlled by both of said track relays and including a front contact of said other auxiliary relay, and a traffic controlling device controlled by a back contact of said one auxiliary relay and a front contact of said other auxiliary relay.

7. In combination, two successive sections of railway track, a track circuit for each section including a track relay, a third and a fourth relay, a pick-up circuit for said third relay including a front contact of both track relays and a back contact of the said fourth relay, a pick-up circuit for said fourth relay including a front contact of both track relays as well as a front contact of said third relay, a stick circuit for said fourth relay including its own front contact and a front contact of both of said track relays, a traffic controlling device, and a circuit for said device controlled by a back contact of said third relay and a front contact of said fourth relay.

8. In combination, two successive sections of railway track, a track circuit for each section including a track relay, a slow-acting and a quick-acting relay, a pick-up circuit for said slow-acting relay including a front contact of both of said track relays and a back contact of said quick-acting relay, a pick-up circuit for said quick-acting relay including a front contact of both of said track relays and a front contact of said slow-acting relay, a stick circuit for said quick-acting relay including its own front contact and a front contact of both of said track relays, and a signal for said sections controlled by a back contact of said slow-acting relay and a front contact of said quick-acting relay.

In testimony whereof I affix my signature.

SAMUEL MISKELLY.